US007030266B2

(12) United States Patent
Köcher et al.

(10) Patent No.: US 7,030,266 B2

(45) Date of Patent: Apr. 18, 2006

(54) METHOD FOR PRODUCING POLYISOCYANATES

(75) Inventors: Jürgen Köcher, Langenfeld (DE); Frank Richter, Leverkusen (DE); Hans-Josef Laas, Bergisch Gladbach (DE); Matthias Wintermantel, Köln (DE)

(73) Assignee: Bayer Aktiengesellschaft, Leverkusen (DE)

(*) Notice: Subject to any disclaimer, the term of this patent is extended or adjusted under 35 U.S.C. 154(b) by 79 days.

(21) Appl. No.: 10/144,612

(22) Filed: May 13, 2002

(65) Prior Publication Data

US 2003/0078450 A1 Apr. 24, 2003

(30) Foreign Application Priority Data

May 14, 2001 (DE) ................................ 101 23 416

(51) Int. Cl.
*C07C 249/00* (2006.01)

(52) U.S. Cl. ...................................... 560/336; 560/355

(58) Field of Classification Search ................ 560/330, 560/336; 524/379

See application file for complete search history.

(56) References Cited

U.S. PATENT DOCUMENTS

| | | | | |
|---|---|---|---|---|
| 3,252,945 | A * | 5/1966 | Ugi et al. | 528/51 |
| 4,265,798 | A * | 5/1981 | Mishra | 428/422.8 |
| 4,379,905 | A | 4/1983 | Stemmler et al. | 528/73 |
| 4,912,210 | A | 3/1990 | Disteldorf et al. | 540/202 |
| 4,960,848 | A | 10/1990 | Scholl et al. | 528/48 |
| 5,266,604 | A | 11/1993 | Spertini | 521/129 |
| 5,329,003 | A | 7/1994 | Bruchmann | 540/202 |
| 5,591,780 | A | 1/1997 | Muha et al. | 521/128 |
| 5,691,438 | A | 11/1997 | Konig et al. | 528/45 |
| 6,239,276 | B1 | 5/2001 | Gupta et al. | 544/213 |
| 6,635,761 | B1 * | 10/2003 | Revelant et al. | 544/222 |
| 2001/0031867 | A1 | 10/2001 | Gupta et al. | 544/215 |
| 2002/0013462 | A1 | 1/2002 | Gupta et al. | 544/215 |

FOREIGN PATENT DOCUMENTS

| | | |
|---|---|---|
| CA | 1335990 | 6/1995 |
| DE | 198 28 935 A1 | 12/1999 |
| EP | 0 982 333 A1 | 3/2000 |
| GB | 1153815 | 5/1969 |

OTHER PUBLICATIONS

Synthesis (month-unavailable) 1975, pp. 463-464 Synthesis of Dimers and Trimers of Benzyl Isocyanates, Reinhard Richter, Henri Ulrich.

Adv. Urethane Technol., 1, (month unavailable) 1971 pp. 33-47 Unconventional Chemistry Isocyanates.

J. Praktt Chem. 336, (month unavailable) 1994 pp. 185-200 Zur Synthese aliphatischer Polyisocyanate-Lackpolyisocyanate mit Biuret-Isocyanurat-oder Uretdionstruktur , Hans Josef Laas, Reinhard Halpaap und Josef Pedain.

* cited by examiner

*Primary Examiner*—Johann Richter
*Assistant Examiner*—Karl Puttlitz
(74) *Attorney, Agent, or Firm*—Joseph C. Gil; Thomas W. Roy

(57) ABSTRACT

The invention relates to a method for making oligomeric isocyanates by reacting diisocyanates in the presence of a catalyst, wherein the catalyst comprises a saline compound prepared from a five-membered N-heterocycles and the N-heterocycle comprises at least one N—H function in the five-membered ring, to the products produced in this way and to polymers prepared from these products.

5 Claims, No Drawings

METHOD FOR PRODUCING POLYISOCYANATES

FIELD OF THE INVENTION

The invention relates to a new method for producing polyisocyanates, to the polyisocyanates produced in this way and to their use.

BACKGROUND OF THE INVENTION

Oligomerization of isocyanates is a long-known, generally accepted method of modifying low molecular weight isocyanates, which are usually difunctional, in order to obtain products with advantageous application properties e.g. in the paint and coating sector; these will be referred to generally as polyisocyanates in this specification (J. Prakt. Chem./Chem. Ztg 1994, 336, 185–200).

Polyisocyanates based on aliphatic diisocyanates are normally used for light-resistant, non-yellowing paints and coatings. The term “aliphatic” refers to the carbon atoms to which the NCO groups of the monomer are bonded, i.e. the compound molecule may perfectly well contain aromatic rings, which do not then of course carry NCO groups.

One can distinguish between different products and processes according to the type of structure mainly formed from the previously free NCO groups in the respective oligomerization reaction.

Particularly important procedures are so-called dimerization to form uretdione structures of formula 1, described for example in DE-A 16 709 720 and so-called trimerization to form isocyanate structures of formula 2, described for example in EP-A 0 010 589. In addition to the last-mentioned trimers isomeric, i.e. also trimeric products with an iminooxadiazindione structure of formula 3 can be obtained as described for example in EP-A 0 798 299 on isocyanurates. If this specification refers to both isomeric trimers, isocyanurates and iminooxadiazindiones, it will generally be speaking of trimers or trimerized compounds, otherwise the exact term will be used. The term “oligomerization” covers all types of modification.

In addition to the products providing the name of the reaction (dimer for dimerization, trimer for trimerization) the other respective reaction products are almost always also produced simultaneously during the dimerization and trimerization of isocyanates: trimers of formulae 2 and 3 during the dimerization and uretdiones of formula 1 during the trimerization, the content of which, however, is low in each case:

1

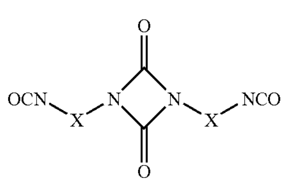

-continued

2

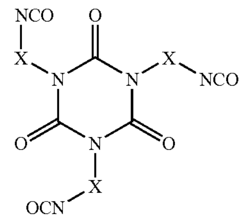

3

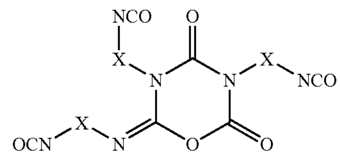

X=difunctional substituent

Complete conversion of all monomeric diisocyanate molecules OCN—X—NCO in one reaction step would lead to high molecular weight, extremely high-viscosity or gel-like products which would be useless in the paint and coatings sector, owing to further reaction of the NCO groups in formulae (ideal structures) 1 to 3. In catalyzed preparation of polyisocyanates for paint the industrial procedure is therefore to convert only part of the monomer, to stop any further reaction by adding a catalyst poison (a “stopper”) and then to separate the non-converted monomer. The aim is to have to separate the smallest possible proportion of non-converted monomer at the lowest possible viscosity of the low-monomer polyisocyanate paint resin, i.e. to obtain high conversion in the reaction accompanied by a high resin yield at the following processing stage with high-level properties of the polyisocyanate resins.

Dimers based on aliphatic diisocyanates have a far lower viscosity than trimers. However they have a strictly linear, i.e. NCO-difunctional structure regardless of the degree of conversion or the resin yield. Trimers on the other hand have the higher functionality required for a high crosslink density in the polymer and consequent good stability properties thereof. Their viscosity increases very rapidly though with increasing conversion in the reaction. Compared with isomeric isocyanurates iminooxadiazindiones have far lower viscosity with the same NCO-functionality of the polyisocyanate resin (cf. Proc. of the XXIVth Fatipec Conference, Jun. 8–11, 1998, Interlaken, CH, vol. D, pp. D-136–137), though they do not reach the viscosity level of uretdiones.

State of the art for producing polyisocyanates of the trimeric type is isocyanate oligomerization using a large number of both saline and covalently structured catalysts (J. Prakt. Chem./Chem. Ztg. 1994, 336, 192 to 196 and literature quoted therein). While very small quantities of catalyst are sufficient for isocyanate oligomerization when using compounds with a saline structure, such as carboxylates (for example DE-A 3 100 263), fluorides (for example EP-A 339 396) or hydroxides (for example EP-A 330 966) and the desired rate of conversion is achieved in a very short time, higher catalyst concentrations and/or prolonged reaction times are required when using covalently structured trimerization catalysts. An example of this is the oligomerization of aliphatic diisocyanates with N-silyl compounds, described, for example in EP-A 57 653, EP-A 89 297, EP-A 187 105, EP-A 197 864 and WO 99/07765.

Up until now, just covalently structured catalyst systems have been described for producing polyisocyanates with uretdione structure (J. Prakt. Chem./Chem. Ztg. 1994, 336, 196 to 198 and literature quoted therein). Most widespread are trialkylphosphines (described inter alia in DE-A 1 670 720) and in pyridines amino substituted in the 4-position (described inter alia in DE-A 3 739 549).

The disadvantage of the method of the state of the art is that, on the one hand, highly active, catalysts with a saline structure are virtually exclusively capable of generating trimers but rarely of forming uretdione and the uretdione selective/uretdione-more selective catalysts are all covalently structured, for which reason they have to be used in comparatively high concentrations, based on the mass of catalyst and isocyanate to be oligomerized, and also only lead to relatively slow progress of the reaction. Both of these factors are disadvantageous in terms of cost efficiency (space/time yield during production) and paint technology (disruptive influences of catalyst and/or catalyst secondary product in the polyisocyanate).

It is an object of the present invention to provide a catalyst system for isocyanate oligomerization which is saline in structure and therefore highly reactive but nevertheless leads to the formation of significant uretdione contents in the resulting polyisocyanate.

The above-described object has been achieved by the use of saline derivatives of five-membered N-heterocycles which carry at least one hydrogen atom bound to a ring nitrogen atom in the neutral molecule, as catalyst for isocyanate oligomerization.

The invention is based on the surprising observation that saline derivatives of five-membered N-heterocycles, which carry at least one hydrogen atom bound to a ring nitrogen atom in the neutral molecule, catalyze isocyanate oligomerization and that uretdione structures are also formed to a considerable extent in the method in addition to isocyanate trimers.

Nitrogen heterocycles are already used in polyisocyanate chemistry as neutral, N—H- or N-alkyl group-carrying compounds. However, they are generally used as blocking agents for NCO groups (NH-group-containing derivatives, cf. EP-A 0 741 157) or as stabilizers to prevent UV radiation-induced damage to the paint film produced from the polyisocyanates, for example, substituted benzotriazoles which contain further OH groups in the molecule, cf. for example DE-A 198 28 935, WO 99/67226 and literature quoted therein.

In the aforementioned fields of application, the aim is not oligomerization of the isocyanate groups, rather their thermally reversible deactivation to enable single component processing or stabilization of the polyurethane plastics material or paint. Oligomerization of the isocyanate groups would even be disadvantageous in both cases.

Furthermore, references are occasionally made in the patent literature to the use of N-heterocycles as additive to influence the catalytic activity of certain catalysts, as catalyst itself or else to suppress undesirable effects such as increase in colour index etc. Therefore, WO 99/23128 describes a system, containing inter alia a "trimerization catalyst" and imidazole. However, again only the neutral compound of the nitrogen heterocycle is used and not the anion. From the examples in WO 99/23128 it emerges that imidazole is added to the isocyanate to be oligomerized, before trimerization, for which reason the above-mentioned addition reaction to the NCO groups of the isocyanates to be modified initially takes place and therefore no "in situ" formation of the imidazolate-anion could be initiated even subsequently, after addition of the "trimerization catalyst".

The dimerization or trimerization of benzylisocyanate under the influence of 1,2-dimethylimidazole is also described in Adv. Ureth. Sci. Techn. 1971, 1, 33 and in Synthesis, 1975, 463. Anions of the heterocycles are not mentioned in the cited documents. There is also no option of an in situ generation of anionic species owing to the absence of an acid H atom in the 1,2-dimethylimidazole. The same applies to the method in EP-A 417 603, EP-A 566 247, EP-A 672 696 and EP-A 982 333, which refer exclusively to heterocycles carrying N-alkyl groups in which generation of anionic species is not possible for the reasons given above.

SUMMARY OF THE INVENTION

The invention relates to a method for making an oligomeric isocyanate comprising reacting a diisocyanate in the presence of a catalyst, wherein the catalyst comprises a saline compound prepared from a five-membered N-heterocycles and the N-heterocycle comprises at least one N—H function in the five-membered ring.

The invention also relates to the polyisocyanates obtained by this method and to their use for the production of polyurethane plastics materials and coatings.

DETAILED DESCRIPTION OF THE INVENTION

In general it is difficult to make predictions about the suitability of certain types of compound as catalysts for isocyanate oligomerization. It is virtually impossible to be able to derive statements on the selectivity with respect to the formation of various isocyanate secondary products and/or the catalytic activity, from the structure of the potential catalyst molecule. Empirical experiments have to be relied upon here. To increase the efficacy of these experiments the catalysts according to the invention are tested in miniaturized and simultaneous modes of operation. As a result a large number of catalysts may be tested simultaneously for activity and product selectivity. The reduction in the batches reduces the quantities of starting material required; the method may be surprisingly well reproduced for first experiments of catalyst activity and product selectivity in isocyanate chemistry. As mentioned above, a large number of empirical experiments have to be relied upon to identify new catalysts, so this acceleration of the test procedure will greatly assist the rapid discovery of new catalytic structures.

For purely analytical questions, such as the assessment of the catalyst activity by determination of the monomer conversion achieved, for example by chromatographic methods, it is sufficient to dilute a sample, intended to interrupt the reaction, with a solvent which is suitable for the appropriate analytical method. These very high dilutions may also stop a further reaction, at least until the results of the analysis have been obtained.

Suitable neutral compounds forming the basis of the heterocyclic anion in the method according to the invention include species of formula (4):

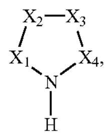

(4)

wherein $X_1$, $X_2$, $X_3$ and/or $X_4$ independently of one another represent "—N═" or "—CR═" range and R independently represents:

H, $C_1$ to $C_{20}$(cyclo)alkyl, $C_6$ to $C_{20}$ aryl, $C_1$ to $C_2$ alkoxy, —$NR'_2$ (R'=$C_1$ to $C_{20}$ alkyl), —$NO_2$, fluorine, chlorine, bromine, fluorinated alkyl, fluorinated alkoxy, cyano, carboalkoxy, —S—R" (R"=$C_1$ to $C_{20}$ alkyl), and/or —S-aryl (aryl=$C_6$ to $C_{20}$ aryl) and in the event two adjacent subsitutents $X_{1-4}$ represent "—CR═", the substituents R of these substituents together with the C-atoms of these substituents may form a further annellated carbo- or heterocyclic, n-membered ring system where n=3 to 10, wherein the annellated carbo- or heterocyclic ring system may, independently of one another, contain one or more heteroatoms (N, O, S) and may be substituted independently of one another by one or more the same or different substituents from the following group: H, $C_1$ to $C_{20}$(cyclo)alkyl, $C_6$ to $C_{20}$ aryl, $C_1$ to $C_{20}$ alkoxy, —$NR'_2$ (R'=$C_1$ to $C_{20}$ alkyl), —$NO_2$, fluorine, chlorine, bromine, fluorinated alkyl, fluorinated alkoxy, cyano, carboalkoxy, —S—R" (R"=$C_1$ to $C_{20}$ alkyl), and/or —S-aryl (aryl=$C_6$ to $C_{20}$ aryl).

Other suitable neutral compounds forming the basis of the heterocyclic anion in the method according to the invention include pyrrole, substituted pyrroles and carbocyclic and/or heterocyclic annellated derivatives of pyrrole.

Other suitable neutral compounds forming the basis of the heterocyclic anion in the method according to the invention include pyrazole and/or imidazole, substituted pyrazoles and/or imidazoles and carbocyclically and/or heterocyclically annellated derivatives of pyrazole and/or imidazole.

Other suitable neutral compounds forming the basis of the heterocyclic anion in the method according to the invention include 1,2,3- and 1,2,4-triazoles, substituted species of 1,2,3- and 1,2,4-triazoles and carbocyclically and/or heterocyclically annellated species of 1,2,3- and 1,2,4-triazoles.

Other suitable neutral compounds forming the basis of the heterocyclic anion in the method according to the invention include tetrazoles and substituted tetrazoles.

To produce the saline catalysts used in the method according to the invention, in principle all five-membered N-heterocycles m ay be used which carry at least one hydrogen atom bound to a ring nitrogen atom. Examples of these include pyrrole, indole, carbazole and substituted derivatives such as 5-nitroindole or 5-methoxyindole, pyrazole, indazole and substituted derivatives such as 5-nitroindazole, imidazole and substituted derivatives such as 4-nitroimidazole or 4-methoxyimidazole, benzimidazole or substituted benzimidazoles, for example 5-nitrobenzimidazole, 5-methoxybenzimidazole, 2-trifluoromethylbenzimidazole, heteroaromatic annellated imidazoles such as pyridinoimidazole or purine, 1,2,3-triazole and substituted derivatives such as 4-chloro-5-carbomethoxy-1,2,3-triazole or 4-chloro-5-cyano-1,2,3-triazole, 1,2,4-triazole and substituted derivatives such as 3,5-dibromotriazole, 1,2,3-benzotriazole and substituted 1,2,3-benzotriazole such as 5-fluor-1,2,3-benzotriazole, 5-trifluoromethyl-1,2,3-benzotriazole, 5-nitro-1,2,3-benzotriazole, 5-methoxy-1,2,3,-benzotriazole, 5-chloro-1,2,3-benzotriazole, 5-tetrafluoroethoxy-1,2,3-benzotriazole, 5-trifluorothio-1,2,3-benzotriazole, 4,6-bis(trifluoromethyl)-1,2,3-benzotriaole, 4-trifluoromethoxy-5-chloro-1,2,3-benzotriazole and heteroaromatic annellated 1,2,3-triazoles such as the isomeric pyridinotriazoles, for example the 1H-1,2,3-triazolo[4,5-b]pyridine—referred to in the remainder of the text as pyridinotriazole—and azapurine.

The above-mentioned compounds are predominantly routinely used substances which are known from the literature. The synthesis of the fluorine-containing derivatives is described, for example in DE-A 43 02 461.

Some of the salts of the above-mentioned nitrogen heterocycles are also comercially available, for example in the form of their sodium salts. On the other hand they can be produced very easily by methods known from the literature, for example if counter-ions other than Na+ are to be used for the catalytically active anion. More details may be found in the examples. The optimum "design" of the anion in respect of catalytic activity, thermal stability and the selectivity of the reaction for the types of isocyanate oligomer formed may further be adapted to the isocyanate to the oligomerized by appropriate substitution in the heterocyclic five-ring compound.

Suitable cations for the oligomerization catalyst include alkali, alkaline-earth and/or monovalent ammonium cations and/or phosphonium cations of formula (5)

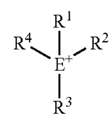

(5)

wherein E represents nitrogen (N) or phosphorus (P) and $R^1$, $R^2$, $R^3$ and $R^4$ independently of one another represent the same or different radicals and are a saturated aliphatic or cycloaliphatic, an optionally substituted aromatic or araliphatic radical with up to 18 carbon atoms respectively.

The of the cation for the catalyst to be used in the method according to the invention is not of great importance. If the catalyst or its secondary products formed in the course of deactivation are to be separated from the product after the oligomerization reaction, it may be advantageous to employ polar, highly charged counter-ions such as alkaline or alkaline earth cations. If the catalyst has to be distributed as homogeneously as possible in the isocyanate (mixture) and the polyisocyanate resin, lipophilic ones such as ammonium or phosphonium types can be chosen. The latter can e.g. be prepared without any problems simply by combining a sodium triazolate and an onium chloride, preferably in solvents which do not readily dissolve the sodium chloride formed, and bringing the mixture to the desired concentration and purity by filtration and subsequent reduction. During the last processing stage residues of initially dissolved sodium chloride are generally also precipitated and can be filtered off. Some examples of suitable onium chlorides are tetra-methyl, -ethyl, -propyl, -butyl, -hexyl and -octyl ammonium chloride but also ammonium salts which are substituted mixed, such as benzyl-trimethylammonium chloride or methyl-trialkylammonium chlorides where alkyl stands for straight-chain or branched C8 to C10 radicals (brand name e.g. Aliquat or Adogen) and tetra-ethyl, -propyl, -butyl, -hexyl and -octyl-phosphonium chloride, but also phosphonium salts which are substituted mixed, such as alkyl-triethyl, tributyl, trihexyl, trioctyl and/or tridodecylphosphonium chloride, where alkyl stands for straight-chain or branched C4 to C20 radicals (brand name e.g. Cyphos, such as Cyphos443, Cyphos3453, Cyphos3653 etc).

To produce the polyisocyanates according to the invention, catalyst concentrations between 5 ppm and 5%, preferably between 10 ppm and 2% based on the mass of (poly)isocyanate (mixture) used and the mass of catalyst used, are sufficient.

The catalysts employed in the method of the invention may be used without solvent or in solution. The solvents may basically be any substances in which the catalyst can dissolve undecomposed and which do not react with isocyanates or react with them only to form trouble-free secondary products that are common in polyurethane chemistry such as ureas, biurets, urethanes and allophanates. If catalyst solvents are employed they are preferably reactive compositions which react with the diisocyanates used as starting components to form secondary products that are common in polyurethane chemistry; hence these compositions need not be separated after the reaction. They include straight-chain or branched alcohols, optionally containing more than one OH group, with 1 to 20 carbon atoms and optionally other heteroatoms, preferably oxygen, in the molecule. Some examples are methanol, ethanol, 1- and 2-propanol, isomeric butanols, 2-ethylhexanol, 2-ethylhexane-1,3-diol, 1,3- and 1,4-butanediol and 1-methoxy-2-propanol. It is particularly advantageous that the above catalysts may be used even in very concentrated solution yet hardly cause any spontaneous over-curing in the isocyanate to be oligomerized.

Kown methods of inhibiting further reaction when the desired stage has been reached ("stopping" the reaction) include removing the catalyst by extraction or filtration—the latter optionally after adsorptive bonding to inert carrier materials—making the catalyst system inactive by thermal deactivation and/or by adding (sub)stoichiometric quantities of acids or acid derivatives, e.g. benzoyl chloride, phthaloyl chloride, phosphinous, phosphonous and/or phosphorous acid, phosphinic, phosphonic and/or phosphoric acid, acid esters of the 6 last-mentioned acid types, sulphuric acid and its acid esters and/or sulphonic acids, preferably mono and dialkyl phosphates such as (di)butylphosphate, (di)octylphosphate or (di)trihexylphosphate, sulphuric acid and its acid esters and/or sulphonic acids, preferably methane sulphonic acid, p-toluene sulphonic acid and alkenebenzene sulphonic acids, alkyl= straight chain or branched $C_2$ to $C_{20}$.

According to a preferred embodiment, the method according to the invention may be carried out in a continuous operation, for example in a tubular reactor.

In principle any aliphatic isocyanates, either pure or mixed together, are suitable as isocyanates to be oligomerized in the method according to the invention. In addition to the NCO groups they usually have 4 to 20 carbon atoms in the carbon skeleton. They may contain aliphatically and/or cycloaliphatically bound NCO groups. Any regio and stereoisomers of the following isocyanates can be given as examples: bis(isocyanate alkyl)ether, bis- and tris-(isocyanate alkyl)benzenes, toluenes and xylenes, propane diisocyanates, butane diisocyanates, pentane diisocyanates, hexane diisocyanates (e.g. hexamethylene diisocyanate, HDI), heptane diisocyanates, octane diisocyanates, nonane diisocyanates (e.g. trimethyl-HDI, generally as a mixture of 2,4,4- and 2,2,4-isomers, TMDI) and triisocyanates (e.g. 4-isocyanate methyl-1,8-octane diisocyanate), decane di- and triisocyanates, undecane di- and triisocyanates, dodecane di- and triisocyanates, 1,3- and 1,4-bis(isocyanate methyl)cyclehaxane ($H_6XDI$), 3-isocyanate methyl-3,5,5-trimethylcyclohexyl isocyanate (isophorone diisocyanate, IPDI), bis-(4-isocyanate cyclohexyl)methane ($H_{12}MDI$) and bis (isocyanate methyl)norbornane (NBDI). HDI, TMDI, methyl-pentane-1,5-diisocyanate (MPDI), $H_6XDI$, NBDI, IPDI and/or $H_{12}MDI$ are preferably used.

Hexamethylenediisocyanate (HDI), trimethyl-HDI (TMDI), 2-methylpentane-1,5-diisocyanate (MPDI), isophorondiisocyanate (IPDI), 1,3- and 1,4-bis(isocyanatomethyl)cyclohexane ($H_6XDI$), bis(isocyanatomethyl)norbornane (NBDI), 3(4)-isocyanatomethyl-1-methylcyclohexylcyanate (IMCI) and/or 4,4'-bis (isocyanatocyclohexyl)methane ($H_{12}MDI$) or mixtures of these diisocyanates are preferably used according to the invention as isocyanates to be oligomerized.

Part-use of monofunctional isocyanates is optionally also possible in special cases.

The production process for the initial isocyanates to be used in the method of the invention is not critical to carrying out the method, thus the initial isocyanates may be produced with or without using phosgene.

The catalytic conversion according to the invention may, in principle, be carried out at any industrially achievable temperature. Reaction temperatures above 0° C. are conventional, the method preferably being carried out at between 20 and 100° C., particularly preferably between 40 and 100° C.

The polyisocyanates according to the invention may be isolated and purified by the conventional state of the art methods, such as thin layer distillation, extraction, crystallisation and/or molecular distillation. They are then in the form of colourless or only slightly coloured liquids or solids.

The polyisocyanates produced according to the invention provide versatile starting materials for producing polymers, such as optionally foamed plastics materials, polyurethane paints, coatings, adhesives and additives.

These products, optionally in NCO-blocked form, are particularly appropriate for making single and dual-component polyurethane paints, since they have lower viscosity than polyisocyanates of the trimer type but otherwise equally good or improved properties. They may be used for this purpose either pure or combined with other state of the art isocyanate derivatives such as uretdione, biuret, allophanate, isocyanurate, urethane or carbodiimide polyisocyanates in which the free NCO groups may optionally have been deactivated with blocking agents.

The resultant plastics and coatings are extremely high-grade products with properties typical of said well-tried prior art systems.

When used as cross-linking components in dual component coatings the products according to the invention are generally combined with known OH and/or NH components from dual component polyurethane systems, e.g. hydroxy-functional polyesters, polyacrylates, polycarbonates, polyethers, polyurethanes and polyfunctional amines. However they may equally be used as single components e.g. for making (partly) moisture-curing plastics and coatings.

Apart from the polyisocyanates according to the invention and any other binder components and paint solvents or paint solvent mixtures which may also be used, such as toluene, xylene, cyclohexane, chlorobenzene, butylacetate, ethylacetate, ethylglycolacetate, methoxypropylacetate, acetone, white spirit or higher substituted aromatics (Solventnaphtha, Solvesso, Shellsol, Isopar, Nappar, Diasol), the coatings may contain further additives, e.g. wetting agents, flow control agents, anti-skinning agents, anti-foam agents, flatting agents, viscosity regulators, pigments, dyes, UV absorbers, catalysts and stabilizers to prevent thermal effects and oxidation.

The polyisocyanates based on the oligomer mixtures produced according to the invention may be used as coatings or additives for a large number of materials, such as wood, plastics material, leather, metal, paper, concrete, masonry, ceramics and textiles.

The invention is further illustrated but is not intended to be limited by the following examples in which all parts and percentages are by weight unless otherwise specified.

EXAMPLES

All percentages are by weight unless otherwise specified.

The NCO content of the resins described in the examples and comparative examples was determined by titration to DIN 53 185.

The dynamic viscosities of the polyisocyanate resins were determined at 23° C. with viscometer VT 550, plate-cone measuring arrangement PK 100 produced by Haake. Readings were taken at different shear speeds to ensure that the flow properties of the inventive polyisocyanate mixtures described and those of the comparative products corresponded to the ideal Newtonian liquids. The shear speed need not therefore be given.

The stated molar % or molar ratio of different types of structure to each other was based on NMR spectroscopic measuring. Unless otherwise specified it always refers to the sum of the types of structure formed from the previously free NCO groups by the modifying reaction (oligomerization). Readings were taken on Bruker's DPX 400 apparatus on approx. 5% specimens ($^{1}$H-NMR) and approx. 50% specimens ($^{13}$C-NMR) in dry $CDCI_3$ at a respective frequency of 400 MHz ($^{1}$H-NMR) and 100 MHz ($^{13}$C-NMR). Small quantities of tetramethylsilane in the solvent with a $^{1}$H-chemical displacement of 0 ppm ($^{1}$H-NMR) and the solvent itself ($CDCI_3$) with a displacement of 77.0 ppm ($^{13}$C-NMR) were respectively taken as a reference for the ppm scale. Data on chemical displacement of the compositions in question were taken from the literature (cf. Die Angewandte Makromolekulare Chemie 1986, 141, 173–183 and literature quoted therein) or obtained by measuring model substances. The 3,5-dimethyl-2-methylimino-4,6-diketo-1,3,5-oxadiazin (a methylisocyanate trimer of the iminooxadiazindione type) obtainable from methylisocyanate by analogy with the method described in Ber. d. dtsch. Chem. Ges. 1927, 60, 295 showed the following respective NMR chemical displacements (in ppm): 3.09, 3.08, 2.84 ($^{1}$H-NMR, $CH_3$) and 148.3, 144.6, 137.3 ($^{13}$C-NMR, C═O/C═N). Iminooxadiazindiones from aliphatic diisocyanates such as HDI had very similar ($^{13}$C-NMR) chemical displacements of the C═O/C═N atoms and should undoubtedly be distinguished as such from other secondary products of isocyanate.

The greater part of the reactions were carried out in a simultaneous operation. Transferability to a conventional laboratory scale has been provided for by appropriate control experiments (cf. Example 4).

Catalyst Production

General

Sodium-1,2,4-triazolate and Na-imidazolate are commercially available from Aldrich or may be produced by deprotonization of 1,2,4-triazole or imidazole, for example with a methanol solution of sodium methanolate, $Na^{+}MeO^{-}$. The resultant methanol solutions of the sodium salt were used as such for catalysis, optionally after preliminary recrystallization of the salt, and were also employed with a counter-ion to the azolate anion other than the $Na^{+}$ cation, for producing catalyst systems. By reacting NH-acid neutral compositions with other alkaline or alkaline earth alkoxides or hydroxides (Li, K, $NH_4$, Mg etc) further catalyst systems can be generated, and these may be used both in the reaction according to the invention and for producing catalyst systems with a counter-ion to the azolate anion other than the above-mentioned alkaline or alkaline earth cations.

Synthesis of an Na derivative and of a tetrabutylphosphonium derivative are then described as an example. Other Na derivatives, other alkali or alkaline-earth derivatives (see Table 1) and other tetraalkylammonium and phosphonium derivatives (see Table 2) were obtained in exactly the same way.

Production of Na-1,2,3-triazolate (Catalyst No. 1)

200 ml dry methanol and 0.25 mol Na-methanolate (30% in methanol, Aldrich, 48 ml) were placed in a three-necked flask mixer with mechanical agitator, internal thermometer and reflux cooler connected to an inert gas unit (argon). 0.25 mol (17.4 g) 1H-1,2,3-triazole (Aldrich) was added thereto in portions at ambient temperature. After 1H-1,2,3-triazole had been added the reaction mixture was stirred for 4 hours at reflux temperature. The solvent was distilled off at reduced pressure and 200 ml methylene chloride were added at ambient temperature to the remaining oily residue. The mixture was stirred for 15 minutes at ambient temperature and the product precipitated as solids was filtered off. The product was analysed by $^{1}$H-NMR spectroscopy and found to be pure and free of the $^{1}$H-1,2,3-triazole used. A 1 M solution of this Na-1,2,3-triazolate in DMSO was produced for catalysis experiments.

Further Na-azolate compounds were obtained from the N—H compounds forming the base in a completely identical manner (Table 1). The compounds were dissolved in the solvents listed in Table 1 for use in the obligomerization reaction according to the invention.

TABLE 1

Catalyst overview

| Catalyst No. | Cation | Anion | Concentration [M] | Solvent |
|---|---|---|---|---|
| 1 | $Na^{+}$ | 1,2,3-triazolate | 1.0 | DMSO |
| 2 | $Na^{+}$ | 1,2,4-triazolate | 1.0 | DMSO |
| 3 | $Na^{+}$ | 1,2,3-benzotriazolate | 0.6 | DMSO |
| 4 | $Na^{+}$ | 5-(trifluoromethyl)thio-1,2,3-benzotriazolate | 1.0 | DMSO |
| 5 | $Na^{+}$ | Pyridino-1,2,3-triazolate | 0.9 | DMSO |
| 6 | $Na^{+}$ | Imidazolate | 1.0 | DMSO |
| 7 | $Na^{+}$ | 4-nitroimidazolate | 1.0 | DMSO |
| 8 | $Na^{+}$ | Benzimidazolate | 1.0 | DMSO |
| 9 | $Na^{+}$ | 5-nitrobenzimidazolate | 1.0 | DMSO |
| 10 | $K^{+}$ | 1,2,3-triazolate | 1.5 | isopropanol |
| 11 | $Na^{+}$ | Purine-anion | 1.0 | DMSO |

Production of tetrabutylphosphonium-1,2,3-triazolate (Catalyst No. 12)

0.1 mol (6.9 g) 1,2,3-triazole (Aldrich), dissolved in 20 ml methanol was added dropwise to 0.1 mol (18 g) of a 30% methanolic sodium methanolate solution (Aldrich) in a three-necked flask mixer with mechanical agitator, internal thermometer and reflux cooler connected to an inert gas unit (nitrogen), at ambient temperature. After addition, the mixture was subsequently stirred for 1 hour at ambient temperature and then 41.3 g of a 71.4% solution of tetrabutylphosphonium chloride, $Bu_4P^+Cl^-$, in isopropanol (0.1 mol; Cyphos® 443P, Cytec product) were added dropwise. Deposition of sodium chloride began immediately after addition of the first drops of tetrabutylphosphonium chloride solution. After addition, the mixture was subsequently stirred for 1 hour at room temperature, filtered and evaporated on the rotary evaporator at approximately 1 mbar and a bath temperature up to 50° C. maximum. The residue was filtered again and the resulting clear, virtually colourless liquid titrated with 0.1 n HCl against phenolic phthalein. Its content amounted to 73% tetrabutylphosphonium-1,2,3-triazolate. The triazolate salt was adjusted to a concentration of 0.8 M in isopropanol for catalysis experiments.

Further azolate systems based on 1,2,4-triazolates, 1,2,3-triazolates, benzotriazolates, imidazolates, benzimidazolates, pyrazolates and related N—H-containing heterocycles and other cations were obtained in a completely identical manner from the neutral compounds containing the underlying N—H groups and ammonium or phosphonium halides. N—H nitrogen heterocycles and ammonium chlorides were obtained from Aldrich, and phosphonium chlorides, optionally dissolved, from Cytec. After working up, the active catalyst content was determined by simple acidimetric titration with 0.1 n HCl. The solutions obtained in this way may be used undiluted or diluted depending on the area of application. Table 2 lists the solvents used for dilution and the concentrations adjusted for the catalysis experiments.

TABLE 2

Catalyst overview

| Catalyst No. | Cation | Anion | Concentration [M] | Solvent |
|---|---|---|---|---|
| 12 | $Bu_4P^+$ | 1,2,3-triazolate | 0.8 | isopropanol |
| 13 | $C_{14}H_{29}P^+(C_6H_{13})_3$ | 1,2,3-triazolate | 1.0 | isopropanol |
| 14 | $C_{14}H_{29}P^+(C_6H_{13})_3$ | 1,2,4-triazolate | 1.0 | 1-methoxy-2-propanol |
| 15 | $Bu_4P^+$ | Benzotriazolate | 0.8 | isopropanol |
| 16 | $Bz(Et_3)N^+$ | 1,2,4-triazolate | 1.0 | 2-ethyl-hexanol |
| 17 | $C_{14}H_{29}P^+(C_6H_{13})_3$ | Pyridinotriazolate | 1.7 | 1-methoxy-2-propanol |

Examples 1 to 3

Oligomerization Reactions According to the Invention

General directions

A rolled edge vessel with septum closure was evacuated twice and filled with argon. 5 ml diisocyanate respectively were fed into the vessel prepared in this way using a syringe. The appropriate quantities of catalyst solution were then added while stirring. See Table 1 and 2 for catalyst numbers. The quantity "mol %" in Table 3 to 6 is based on the respective entity quantity of diisocyanate and catalyst used to obtain the conversion achieved in the respective experiments. The reaction mixture obtained was reacted in an oil bath or in an agitated heating block (for example Variomag reaction block 48.2/RM from H&P) at the desired temperature. After the reaction had finished, defined either by a predetermined reaction time or by attainment of an appreciable viscosity, an aliquot of the reaction mixture (20 to 40 mg) was dissolved in 3 ml chloroform and analysed by gel permeated chromatography. The reacted quantity of diisocyanate ascertained was a measure of the activity of the catalyst. The product selectivity of a catalyst was analysed either by HPLC- or by $^{13}$C-NMR. Approximately 50 mg of the reaction mixture was reacted with excess 2-methoxyphenylpiperazine (MPP) in acetonitrile for the HPLC analysis, on the one hand to derivatise the isocyanate groups and, on the other hand, to be able to identify the individual components of the polyisocyanate mixture in the form of their MPP derivatives more easily by UV detection. Only the oligomers with the lowest respective molecular weight were taken into account, i.e. the ideal structures 1, 2 and 3 as reaction product each with 2 or 3 mol MPP. 0.5 ml reaction mixture with stoichiometric quantities of di-n-butylphosphate, based on the catalyst quantities used, was used for $^{13}$C-NMR analysis in order to deactivate the catalyst and to stop a further reaction. The $^{13}$C-NMR spectroscopic investigations took place in approximately 50% solution in deuterised chloroform. As already stated above, the structures of all oligomers and not only the "ideal structures" were summarily detected. Comparative details therefore refer to the entity quantity (mol) of the uretdione, isocyanurate and iminooxadiazindione types of structure.

A plurality of experiments are usually carried out simultaneously. In the process either a plurality of concentrations of one catalyst were tested simultaneously, or a plurality of catalysts were tested at different concentrations. In principle this methodology may be adopted with all available NCO-mono, -di or even -higher functional isocyanates.

Comparison Examples 1 to 3

The reaction of various aliphatic diisocyanates with the catalysts known from the literature:

Benzyltrimethylammonium hydroxide, cf. EP-A 0 010 589 (the product sold by Aldrich as a 40% methanol solution under the trade name Triton® B was used), Tri-n-butylphosphine, cf. DE-A 16 70 720 (catalyst: Cytop® 340, Cytec, undiluted) and 4-dimethylaminopyridine, cf. DE-A 37 39 549 (catalyst: DMAP, Aldrich, undiluted) was carried out in accordance with the above-described directions. Tables 3 and 4 show selected results of analysis and calculation for the use of these catalysts not in accordance with the invention. It is immediately clear that the tetraalkylammonium hydroxide with saline structure was very active but provided only small uretdione contents in the product mixture. While the two covalently structured catalysts provided high proportions of uretdione in the product mixture, their activity was low, so even when high catalyst concentrations were used, in particular with the cycloaliphatic diisocyanates IPDI and $H_{12}$MDI, there was only a very slow reaction.

TABLE 3

Results of the HDI oligomerization with catalysts known from the literature (comparison example 1, not according to the invention)

| | Reaction | | | | | Products | | |
|---|---|---|---|---|---|---|---|---|
| Comparison example | Catalyst | Catalyst concentration [mol %] | Time [h] | Temp [° C.] | Conversion [%][1)] | Uretdione [%][2)] | Isocyanurate [%][2)] | Iminooxa-diazindione [%][2)] |
| A | Triton B (40% in methanol) | 0.035 | 0.25 | 60 | 42.7 | 2.1 | 94.4 | 3.5 |
| B | Tri-n-butylphosphine | 1.30 | 1.5 | 60 | 40.6 | 69.7 | 15.7 | 14.6 |

[1)] determined by gel permeation chromatography (conversion = 100 − HDI quantity)
[2)] determined by HPLC, standardised to the 3 species listed in the Table (ideal structures 1, 2 and 3)

TABLE 4

Results of the IPDI- (comparison examples 2a–c) and $H_{12}MDI$ oligomerization (comparison examples 3a–c) with catalysts known from the literature (not according to the invention)

| | Reaction | | | | | Products | |
|---|---|---|---|---|---|---|---|
| Comparison example 1 | Catalyst | Catalyst concentration [mol %] | Time [h] | Temperature [° C.] | Conversion [%][1)] | Uretdione [mol %][2)] | Isocyanurate [%][2)] |
| 2a | Triton B (40% in methanol) | 0.07 | 2.5 | 60 | 43.1 | 2.1 | 97.9 |
| 2b | 4-dimethylaminopyridine | 1.7 | 24 | 40 | 30.0 | 98.8 | 1.2 |
| 2c | Tri-n-butylphosphine | 2 | 5.5 | 40 | 18.7 | 69.3 | 30.7 |
| 3a | Triton B (40% in methanol) | 0.2 | 21.5 | 40 | 51.7 | 1.2 | 98.8 |
| 3b | 4-dimethylaminopyridine | 2 | 456 | 40 | 14.3 | 97.8 | 2.2 |
| 3c | Tri-n-butylphosphine | 2 | 48 | 40 | 3.9 | 86.5 | 13.5 |

[1)] determined by gel permeation chromatography (conversion = 100 − monomer quantity)
[2)] determined by $^{13}C$—NMR spectroscopy, standardised to the two types of structures listed in the table

TABLE 5

Results of the HDI oligomerization according to the invention (Example 1)

| | Reaction | | | | | Products | | |
|---|---|---|---|---|---|---|---|---|
| Example 1 | Catalyst No. (see TABLES 1 and 2) | Catalyst concentration [mol %] | Time [h] | Temperature [° C.] | Conversion [%][1)] | Uretdione [%][2)] | Isocyanurate [%][2)] | Iminooxa-diazindione [%][2)] |
| a | 1 | 0.06 | 0.33 | 60 | 30.1 | 59.2 | 23.3 | 17.6 |
| b | 2 | 0.19 | 2.0 | 60 | 44.6 | 22.6 | 67.7 | 9.7 |
| c | 3 | 0.10 | 0.58 | 60 | 43.1 | 58.6 | 16.5 | 24.9 |
| d | 4 | 0.13 | 0.92 | 60 | 32.2 | 57.5 | 34.5 | 8.0 |
| e | 5 | 0.15 | 5.0 | 60 | 33.9 | 74.6 | 11.4 | 14.0 |
| f | 7 | 0.65 | 3.5 | 60 | 57.3 | 34.9 | 31.3 | 33.7 |
| g | 8 | 0.13 | 0.5 | 60 | 27.8 | 24.3 | 69.0 | 6.7 |
| h | 9 | 0.09 | 1.75 | 60 | 54.5 | 35.7 | 56.9 | 7.4 |
| i | 10 | 0.03 | 0.5 | 60 | 18.1 | 40.0 | 49.0 | 10.0 |
| j | 11 | 0.01 | 1.25 | 60 | 47.7 | 12.3 | 82.9 | 4.9 |
| k | 12 | 0.01 | 0.5 | 60 | 30.6 | 43.8 | 34.9 | 21.3 |
| l | 13 | 0.06 | 0.5 | 80 | 17.5 | 66.4 | 15.0 | 18.6 |
| m | 14 | 0.03 | 1.75 | 70 | 28.3 | 21.5 | 71.5 | 7.0 |
| n | 15 | 0.05 | 1.0 | 70 | 34.2 | 35.4 | 46.4 | 18.2 |
| o | 16 | 0.07 | 1.0 | 60 | 29.9 | 26.3 | 60.5 | 13.2 |
| p | 17 | 0.03 | 5.5 | 60 | 38.7 | 50.9 | 39.3 | 9.8 |

[1)] determined by gel permeation chromatography (conversion = 100 − HDI quantity)
[2)] determined by HPLC standardised to the 3 species listed in the table (ideal structures 1, 2 and 3)

TABLE 6

Results of the IPDI- (Example 2) and $H_{12}$MDI-oligomerization (Example 3) according to the invention

| | Reaction | | | | | Products | |
|---|---|---|---|---|---|---|---|
| Example | Catalyst No. (see TABLES 1 and 2) | Catalyst concentration [mol %] | Time [h] | Temperature [° C.] | Conversion [%]$^{1)}$ | Uretdione [mol %]$^{2)}$ | Isocyanurate [%]$^{2)}$ |
| 2 | 6 | 0.5 | 0.25 | 40 | 48.0 | 40.5 | 59.5 |
| 23 | 6 | 0.5 | 0.08 | 40 | 35.5 | 43.1 | 56.9 |

$^{1)}$determined by gel permeation chromatography (conversion = 100 − monomer quantity)
$^{2)}$determined by $^{13}$C—NMR spectroscopy, standardised to the two types of structure listed in the table

Example 4

Production according to the invention of an HDI polyisocyanate 1,680 g (10 mol) freshly distilled HDI were stirred for 1 hour in a three-necked flask mixer, initially at 60° C. under vacuum (0.1 mbar) to removed dissolved gases, and subsequently ventilated with dry nitrogen, and catalyst solution No. 13 was then added dropwise while stirring at 60° C. until the reaction started, detected by a rise in temperature of one to two degrees. The reaction was carried out within 1 hour at a mixture temperature between 60 and 70° C. to the desired conversion, detected by the refractive index $n_D^{20}$, by occasional addition of further catalyst (total: 4.6 g catalyst solution=0.046 mol % catalyst, based on the entity quantities of HDI and tetradecyl(trihexyl)phosphonium-1,2,3-triazolate used). At $n_D^{20}$=1.4668 the further reaction was interrupted ("stopped") by adding 1.9 g of a 42% solution of p-toluenesulphonic acid in isopropanol. The crude product obtained in this way was subsequently liberated from unreacted monomer by thin-layer distillation at 120° C./0.1 mbar in a short-path evaporator. 572.9 g, corresponding to 34.1% resin yield, of a virtually colourless polyisocyanate resin with the following data: NCO content: 23.0%, viscosity at 23° C.:280 mpas, free monomer: 0.11%, was formed as distillation residue. The structural composition of the polyisocyanate resin was determined as described at the outset: 51 mol % uretdiones, 22.4 mol % isocyanurates, 26.6 mol % iminooxadiazinediones. The recovered HDI may be reused without difficulty.

Example 5

Application Example 10 g of the polyisocyanate obtained in Example 4 were initially mixed with 50 mg of a 10% solution of dibutyltindilaurate in butylacetate and subsequently mixed with 24.7 g of a hydroxyl group-containing acrylate produced from 40% styrene, 34% hydroxyethylmethacrylate, 25% butylacrylate and 1% acrylic acid with an OH content to DIN 53 240 of 3%, and acid value to DIN 53402 of 8 and a viscosity of 3,500 mPas at 23° C. (as 70% solution in butylacetate). (NCO:OH ratio=1.1:1), applied in a 120 μm thick layer to a glass sheet and subjected to forced drying for 30 minutes at 60° C. A clear, high-gloss paint film which did not exhibit any damage after 100 double strokes with MEK and could not be scratched with an HB pencil was obtained.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method for making oligomeric isocyanates comprising reacting a diisocyanate in the presence of a catalyst, wherein the catalyst consists of a saline compound prepared from an anion of a compound selected from the group consisting of pyrrole, substituted pyrrole, carbocyclically annellated derivatives of pyrrole, heterocyclically annellated derivatives of pyrrole, pyrazole, imidazole, substituted pyrazole, substituted imidazole, carbocyclically annellated derivatives of pyrazole, heterocyclically annellated derivatives of pyrazole, heterocyclically annellated derivatives of imidazole, 1,2,3- or 1,2,4-triazole, carbocyclically annellated species of 1,2,4-triazole, heterocyclically annellated species of 1,2,3- or 1,2,4-triazole, and mixtures thereof and a cation selected from alkali, alkaline-earth and/or monovalent ammonium cations and/or phosphonium cations of formula (5)

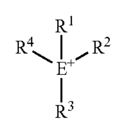
(5)

wherein

E represents nitrogen or phosphorus and $R^1$, R2, $R^3$ and $R^4$ independently of one another represent the same or different radicals selected from a saturated aliphatic or cycloaliphatic, or an optionally substituted aromatic or araliphatic radical with up to 18 carbon atoms respectively; and said anion is formed prior to reacting said dilsocyanate with said catalyst.

2. The method of claim 1, wherein the monovalent ammonium cation and/or phosphonium cation is selected from the group consisting of tetra-methyl ammonium chloride; tetra-ethyl ammonium chloride; tetra-propyl ammonium chloride; tetra-butyl ammonium chloride; tetra-hexyl ammonium chloride; tetra-octyl ammonium chloride; benzyl-trimethylammonium chloride; methyl-trialkylammonium chlorides wherein the alkyl groups are straight-chain or branched $C_6$ to $C_{10}$ radicals; tetra-ethyl phosphonium chloride; tetra-propyl phosphonium chloride; tetra-butyl phosphonium chloride; tetra-hexyl phosphonium chloride; tetra-octyl phosphonium chloride; phosphonium chlorides with mixed substituents selected from alkyl-triethyl, alkyl-tributyl, alkyl-trihexyl, alkyl-trioctyl and alkyl-tridodecyl, wherein the alkyl group is a straight-chain or branched $C_4$ to $C_{20}$ radicals;

and combinations thereof.

3. The method of claim 1 wherein the dilsocyanate or the mixture of diisocyanates comprise 4 to 20 carbon atoms in the carbon skeleton besides the NCO groups.

4. The method of claim 1 wherein the dilsocyanate or the mixture of diisocyanates comprise aliphatically and/or cycloaliphatically bound NCO groups.

5. The method of claim 1 wherein the diisocyanate or the mixture of diisocyanates comprise hexamethylenediisocyanate (HDI), trimethyl-HDI (TMDI), 2-methylpentane-1,5-diisocyanate (MPDI), isophoronediisocyanate (IPDI), 1,3- and 1,4-bis(isocyanatomethyl)cyclohexane ($H_6$XDI), bis (isocyanatomethy)norbomane (NBDI), 3(4)-isocyanatomethyl-1-methyl-cyclohexylcyanate (IMCI) and/or 4,4'-bis (isocyanatocyclohexyl)methane ($H_{12}$MDI).

* * * * *